March 26, 1929.  D. E. WILLARD  1,706,429
DRIVING GLASSES
Filed July 23, 1926
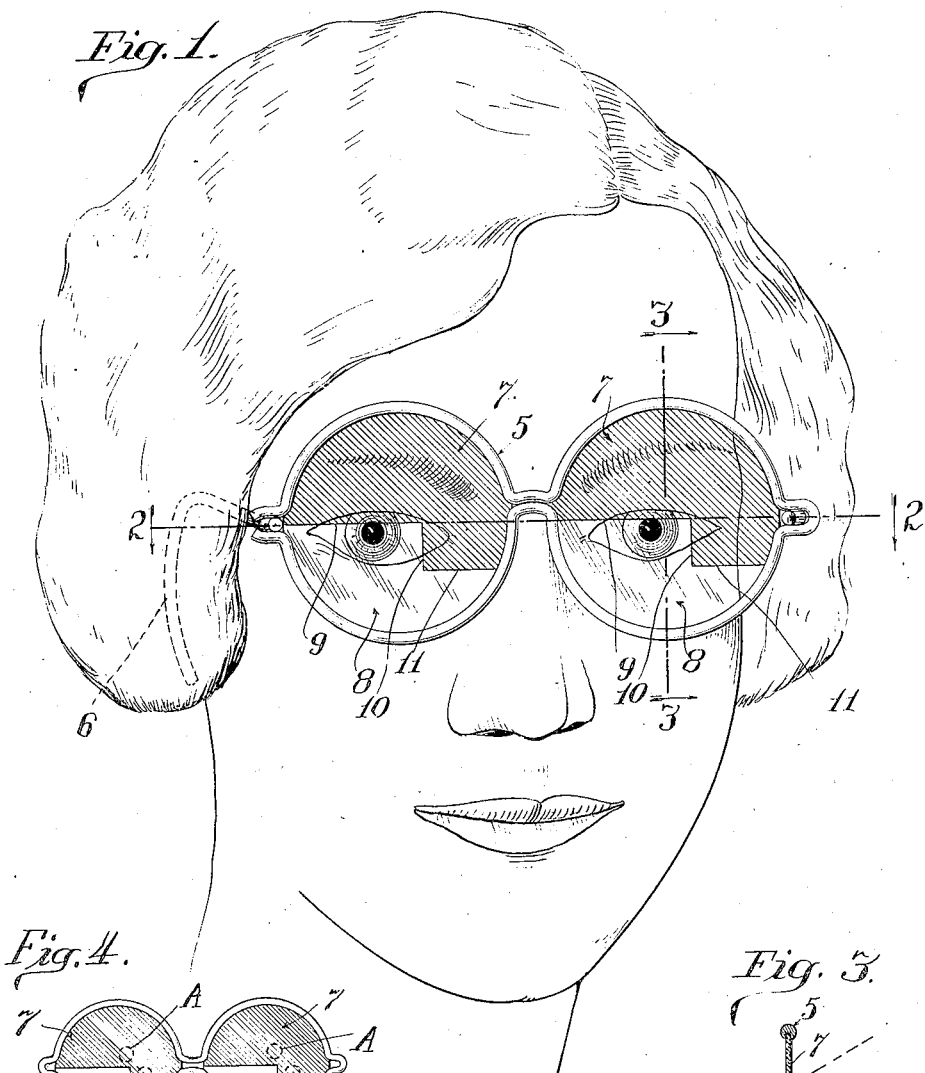
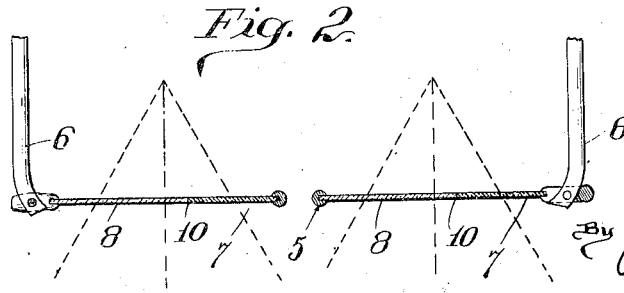
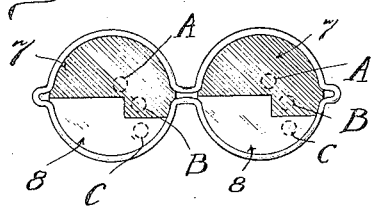
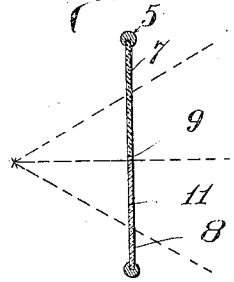
Inventor
Donald E. Willard Patented Mar. 26, 1929.

1,706,429

UNITED STATES PATENT OFFICE.

DONALD E. WILLARD, OF DANVILLE, ILLINOIS.

DRIVING GLASSES.

Application filed July 23, 1926. Serial No. 124,371.

My invention relates to glasses, and more particularly to driving glasses for use by operators of motor and other vehicles, to prevent blinding of the operator when the sun is shining brightly or when driving at night and meeting approaching vehicles having brilliant headlights.

An object of the invention is to provide means whereby vehicle drivers may have clear vision against brilliant lights without blinding.

Another object of the invention is to provide driving glasses having translucent and transparent portions.

Another object is to provide driving glasses for use against bright sun or artificial light which will effectively absorb some of the light rays so as to permit clear vision to the wearer without blinding him. A still further object of the invention is to provide driving glasses for use against bright sun or artificial light having translucent and transparent portions so disposed as to provide clear vision to certain parts and shielded vision to other parts.

A further object of the invention is to provide driving glasses for the purpose intended composed of two part lenses of translucent and transparent portions, the former being disposed in such manner as to permit clear vision ahead and to the right through the transparent part and upwardly and to the left through the translucent part.

A still further object of the invention is to improve driving glasses for generally successful commercial use, which may be economically made and sold.

Generally speaking, I carry out the preferred embodiment of my invention by forming glasses with the lenses comprising a translucent portion and a transparent portion. The translucent portion is defined by a line at substantially the horizontal axis of the eye, which extends horizontally from the right side of the lens to a point slightly to the left of the vertical axis of the eye and then downwardly a short distance and then horizontally to the left margin of the lens. The balance of the lens outline being transparent, which transparent portion may be occupied by clear glass or other material or by nothing at all.

In the specification and claims, I use the word "lens" to mean the complete lens surface or outline as ordinarily understood in connection with glasses for the eyes. The word "frame" to indicate the usual shape of frames for glasses for the eyes, where frames are used for such glasses.

"Translucent" is used to indicate any glass or other material having light absorbing qualities or light shading qualities, and "transparent" is used to mean any glass or other material affording clear vision or no material at all. The above recited and other items of my invention will be apparent from the following description and drawings and will be particularly pointed out in the appended claims.

In the drawings:

Fig. 1 is a front elevational view of the preferred embodiment of glasses shown as the same appear on the face of the wearer.

Fig. 2 is a horizontal sectional view taken on line 2—2 of Fig. 1,

Fig. 3 is a vertical section taken on line 3—3 of Fig. 1, and

Fig. 4 is a diagrammatic representation of the front of the glasses showing the positions of the eyes of the wearer under various conditions of use.

In the drawings I have shown my invention in the form of a pair of spectacles, although I do not confine the use of the invention to spectacles or to glasses requiring frames. My invention is susceptible of use in eye glasses and also in rimless spectacles or other forms of glasses for the eyes.

In the drawings 5 indicates generally the frame of a pair of spectacles having the usual temple members 6.

Each of the lenses comprises a translucent portion 7 and a transparent portion 8. The translucent portion 7 may be made of glass, either optical or some other clear glass, or of such other material as will provide suitable means for carrying out the purpose of the invention. This translucent portion is intended to absorb enough of the light rays either of the sun or of artificial light, so as not to blind the wearer. As will be noted, the translucent portion 7 comprises slightly more than half of the lens surface of each lens. I prefer to make the lower portion of the translucent part 7 in the manner shown in the drawings, that is, defining this lower margin by a horizontally extending line 9, which is disposed at or slightly above the horizontal axis of the eye and which extends to a point a little to the left of the vertical axis of the eye whereupon said line is directed downwardly as at 10 a distance below the horizontal axis of the eye and then horizontally as at 11 to the left of the lens surface. Thus the translucent portion comprises all of the upper portion of the lens surface and a part of the lower half or portion of the lens surface.

The transparent portion of the lens may, as before described, be made of optical or other clear glass or of no material at all.

By so arranging the translucent portion 7 in the manner above described, it will be apparent that the wearer, holding his head in normal position when driving a motor vehicle, will have clear vision ahead and to the right and downwardly without turning his head while the vision to the left and upwardly will be shaded. Thus on meeting an approaching vehicle at night, which has brilliant headlights, the operator of the vehicle wearing the glasses of my invention, may by slightly lowering his head so that his vision ahead towards the light will be shaded by the translucent portion 7, still have clear vision below this portion to permit him to guide his vehicle safely past the oncoming vehicle. The depending portion of the translucent part 7 will shade his eyes from the left, thus permitting him to drive with perfect safety against the brilliant headlights of the oncoming vehicle. If the operator desires to have clear vision to the left, he may, by turing his head to the left slightly have clear vision in that direction along the vertical edge 10 of the translucent portion 7.

The remarks just made with respect to the lights of an oncoming vehicle, apply to bright sunlight as well.

In Fig. 2 of the drawings I have shown diagrammatically the angles of vision of the eyes of a person wearing these glasses and looking straight ahead where the lower margin 9 of the translucent portion terminates a very slight distance above the horizontal axis of the eye. From Fig. 2 it will be apparent that the eye has clear vision for more than half of its arc with shaded vision at the left of the arc.

In Fig. 3 of the drawings I have shown diagrammatically the angle of vision of the wearer when looking straight ahead, with the horizontal axis of the eye passing along at the horizontal part 9 of the translucent portion 7 with half of the normal vision free or clear, and the other half shaded by the translucent part 7.

In Fig. 4 of the drawings I have shown positions of the eyes of the wearer under various conditions of use. A represents the position of the pupil of the eye when the wearer is facing the sun or overhead light. B indicates the position of the pupil when meeting bright headlights of an oncoming vehicle and C is the position of the pupil when desiring clear vision to the left.

I do not wish to be understood as limiting my invention to a translucent portion defined by a lower margin exactly as has been heretofore described, as I am aware that in the manufacture of optical goods it is sometimes difficult to secure the square corners, such as are shown in the drawings of my invention. However, I desire to have it understood that the translucent portion of my invention is to be made after the general outline of the portion 7 as shown in the drawings herein.

Where reference is made to the bottom of the translucent portion 7 as Z-shaped, I mean to refer to the Z-shape as understood in connection with commercial shapes of steel, that is where the flanges are at right angles to the web and extending on opposite sides thereof.

When one is wearing the glasses of my invention, he should turn his head slightly to the right, looking through the portion directly above the line 11 and to the left of 10, for avoiding the glare of the lights of an approaching machine, or when looking against the brilliant sun. Raising the head slightly will permit clear vision to the left at street intersections or railroad crossings, that is, looking under the portion 11 of the glasses. The upper part 7 of the glasses is used for protection against the sun, or overhead street lights.

Using the glasses as above directed permits the wearer to have clear vision of all of the road except that which is in line with and to the left of the approaching light or brilliant sun.

I claim:

1. Glasses of the character described including translucent portions and clear portions, the translucent portion in each lens being defined by a line extending substantially horizontally and substantially midway of the height of the lens from the right side thereof to a point at the left from the vertical axis thereof, then downwardly, stopping short of the lowest portion of the lens and then horizontally to the left margin of the lens with the clear portion of the lens completing the balance of the lens outline.

2. Glasses of the class described, including a pair of lenses, each lens having a translucent portion occupying the upper part of the lens, the lower edge of the translucent portion being defined by two horizontal lines at different elevations connected by a vertical line at the left of the vertical axis of the lens and with the higher horizontal line at approximately the horizontal axis of the lens.

DONALD E. WILLARD.